(12) United States Patent
Ma et al.

(10) Patent No.: US 12,448,916 B2
(45) Date of Patent: Oct. 21, 2025

(54) HYDROGEN FUEL HIGH-SPEED ROTATING MAGNETOHYDRODYNAMIC POWER GENERATION DEVICE

(71) Applicant: NORTH UNIVERSITY OF CHINA, Taiyuan (CN)

(72) Inventors: Tiehua Ma, Shanxi (CN); Boren Yao, Shanxi (CN); Kun Zhang, Shanxi (CN); Changxin Chen, Shanxi (CN); Yaoyan Wu, Shanxi (CN); Chuanmeng Sun, Shanxi (CN); Bin Jiao, Shanxi (CN); Yu Wang, Shanxi (CN); Na Feng, Shanxi (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 18/703,928

(22) PCT Filed: Dec. 16, 2021

(86) PCT No.: PCT/CN2021/138748
§ 371 (c)(1),
(2) Date: Apr. 23, 2024

(87) PCT Pub. No.: WO2023/070891
PCT Pub. Date: May 4, 2023

(65) Prior Publication Data
US 2025/0003365 A1 Jan. 2, 2025

(30) Foreign Application Priority Data
Oct. 30, 2021 (CN) .......................... 202111276723.0

(51) Int. Cl.
*F02C 3/16* (2006.01)
*F02C 3/22* (2006.01)
*H02K 7/18* (2006.01)

(52) U.S. Cl.
CPC ................ *F02C 3/165* (2013.01); *F02C 3/16* (2013.01); *F02C 3/22* (2013.01); *H02K 7/1823* (2013.01)

(58) Field of Classification Search
CPC ... F02C 3/165; F02C 3/16; F02C 3/22; H02K 7/1823
See application file for complete search history.

(56) References Cited

U.S. PATENT DOCUMENTS 6,298,653 B1 * 10/2001 Lawlor ..................... F02C 7/04
60/768
2003/0002976 A1 * 1/2003 Dial ......................... F01D 1/36
415/90

(Continued)

FOREIGN PATENT DOCUMENTS

CN 1097485 A 1/1995
CN 101413462 A 4/2009

(Continued)

OTHER PUBLICATIONS

International Search report PCT/CN2021/138748 dated Jul. 27, 2022 (pp. 1-2).

*Primary Examiner* — Gerald L Sung
*Assistant Examiner* — Rene D Ford
(74) *Attorney, Agent, or Firm* — Millen, White, Zelano & Branigan P.C.; William F. Nixon

(57) ABSTRACT

The present invention relates to the technical field of hydrogen fuel power generation, specifically a hydrogen fuel high-speed rotating magnetohydrodynamic power generation device. The device comprises a shaft portion, a cover plate portion, a thin plate portion and a combustion propelling portion. The device craftily utilizes hydrogen electrochemical reaction and direct combustion of unionized hydrogen to complete the hydrogen catalytic ionization reaction while providing jet thrust for rotation. Advantages (Continued)

are that it is more efficient than hydrogen fuel cells, has high power density, which is suitable for high-power and high-energy power needs, utilizes no key special components and does not require auxiliary systems such as heat dissipation, breaking limitations of proton exchange membrane on hydrogen fuel cells and low efficiency of a Carnot cycle on hydrogen internal combustion engines.

11 Claims, 6 Drawing Sheets

(56) References Cited

U.S. PATENT DOCUMENTS

| | | | |
|---|---|---|---|
| 2008/0231051 A1* | 9/2008 | Toriyama | H02K 7/1823 |
| | | | 290/52 |
| 2013/0156546 A1* | 6/2013 | Kim | F03B 3/00 |
| | | | 415/80 |
| 2013/0327010 A1* | 12/2013 | Muller | F02C 5/10 |
| | | | 415/203 |
| 2015/0037134 A1 | 2/2015 | Isaev | |
| 2015/0226118 A1 | 8/2015 | Kelly et al. | |
| 2018/0142556 A1* | 5/2018 | McGuire | F01L 1/36 |
| 2021/0355867 A1* | 11/2021 | Kirk | F23R 3/52 |
| 2023/0108404 A1* | 4/2023 | Anderson | F02B 41/10 |
| | | | 415/1 |

FOREIGN PATENT DOCUMENTS

| | | |
|---|---|---|
| CN | 102374070 A | 3/2012 |
| CN | 103201459 A | 7/2013 |
| CN | 209398454 U | 9/2019 |
| KR | 20140124656 A | 10/2014 |

* cited by examiner

HYDROGEN FUEL HIGH-SPEED ROTATING MAGNETOHYDRODYNAMIC POWER GENERATION DEVICE

TECHNICAL FIELD

The invention relates to the technical field of hydrogen fuel power generation, specifically a hydrogen fuel high-speed rotating magnetohydrodynamic power generation device.

BACKGROUND OF THE INVENTION

In the field of hydrogen fuel cells, how to convert the chemical energy of hydrogen into electrical energy more efficiently has always been a subject of human research and exploration. The patent of "Vortex Type Hydrogen Flame Magnetohydrodynamic Power Generation/Jet Engine All-In-One Machine and Power Generation Method" (CN112983674A) has provided a device that places the hydrogen electrochemical reaction in a magnetic field for high-speed rotation. Although regarding the effect, this device has higher power than the current hydrogen fuel cell and does not rely on the performance of the proton exchange membrane, the rotation mechanism generated by the vortex is more complex, and the energy from exhaust emissions is not fully utilized, which means that energy loss reduction cannot be realized at the same time of simple efficient rotation. The hydrogen electrochemical reaction is placed in a high-speed rotating environment in a strong magnetic field for electricity conduction of the hydrogen flame, thereby generating electricity. It is analogous to the lightning phenomenon that occurs in nature under breakdown discharges under water, air flow and magnetic field conditions. The essence is to convert kinetic energy into electrical energy and release huge energy. Problems exist whether it is possible to construct a device imitating lightning under the same environment, and make its breakdown effect complementary to hydrogen flame conduction to make further utilization.

Therefore, to address the above problems, the present invention provides a hydrogen fuel high-speed rotating magnetohydrodynamic power generation device that is different from traditional hydrogen fuel cells and the vortex hydrogen flame magnetohydrodynamic power generation/jet engine all-in-one machine and allows hydrogen electrochemical reactions to occur efficiently.

SUMMARY OF THE INVENTION

The present invention intends to provide a hydrogen fuel high-speed rotating magnetohydrodynamic power generation device that is different from traditional hydrogen fuel cells and the vortex hydrogen flame magnetohydrodynamic power generation/all-in-one machine and allows hydrogen electrochemical reactions to occur efficiently.

The present invention is realized by the following technical solutions: a hydrogen fuel high-speed rotating device, comprising a shaft portion, a cover plate portion, a thin plate portion and a combustion propelling portion;

The shaft portion comprising a central shaft with a hollow structure, and at least one fixing bearing rotatably installed on the central shaft, wherein at least three hydrogen supply channel ports and at least three fuel channel ports are provided on the central shaft;

The cover plate portion comprising a cover plate fixedly installed on the central shaft, wherein an upper surface of the cover plate has at least three top fan blades, all the top fan blades are arranged radially with the central shaft as a center, and at least one air inlet is provided at a junction of a same side of each top fan blade with the cover plate;

The thin plate portion comprising at least three layers of thin plates that are stacked in an axial direction and are fixedly installed on the central shaft, wherein adjacent thin plates have therebetween a space to allow fuel to pass, an upper thin plate is sealed and fixedly connected to a lower surface of the cover plate, all thin plates are separated into independent sector regions by at least three arc partitions arranged radially with the central shaft as a center, all arc partitions are arranged in a same twisted manner, all thin plates outside each sector region are sealed and fixed with external partitions, an ignition hydrogen supply channel is arranged interior of a side of each arc partition near an outer arc along an extension direction, a fuel channel is arranged interior of a side of each arc partition near an inner arc along the extension direction, several fuel outlets in communication with a space between the thin plates in a corresponding sector region are provided on a side of an inner arc of all fuel channels, an inner end of the ignition hydrogen supply channel is in abut communication with a corresponding hydrogen supply channel port, an inner end of the fuel channel is in abut communication with a corresponding fuel channel port, a tail of each sector region along a rotation direction has a tip outlet that allows fuel to pass, each sector region also has an air inlet channel in communication with the air inlet, the air inlet channel is independent from a space between thin plates in the sector region, the outlet end of the air inlet channel extends to an outer edge of the thin plate and is close to the tip outlet, an outer end of the ignition hydrogen supply channel extends to the outer edge of the thin plate and is close to the outlet end of the air inlet channel, and an outer end of the fuel channel has a sealed structure; and The combustion propelling portion comprising an isolation portion arranged on the outer edge of all thin plates, wherein an inner edge of the isolation portion is in clearance-fit with an upper portion and a lower portion of all sector regions respectively, the isolation portion is capable of being enclosed into a combustion chamber, and an outer edge of the isolation portion has at least one exhaust discharge port.

The present invention further provides a hydrogen fuel high-speed rotating method utilizing the hydrogen fuel high-speed rotating device as described above, comprising the following steps:

(1) Ignition Initiation:

The hydrogen supply channel port is opened, the fuel channel port is closed, hydrogen is delivered to the combustion chamber after passing through the hydrogen supply channel port and the ignition hydrogen supply channel of the arc partition in sequence, an electric spark is generated under external artificial power supply to ignite part of the hydrogen in the combustion chamber, air is transmitted to the combustion chamber sequentially through the air inlet and the air inlet channel, and combustion of hydrogen at an hydrogen outlet of the ignition hydrogen supply channel drives the central shaft, the cover plate portion and the thin plate portion to start rotating along the fixing bearing;

(2) High-Speed Rotation:

After reaching a predetermined speed, the hydrogen supply channel port is closed, the fuel channel port is opened, hydrogen is delivered to the combustion chamber after passing through the fuel channel port, the fuel channel, a fuel outlet, space between thin plates of the sector region, and the tip outlet in sequence, air is sucked in by a large amount from the air inlet and the air inlet channel to be mixed with the hydrogen at the tip outlet for lean burn in a gap formed by the combustion chamber, generating a hydrogen flame, which is ejected along the tip outlet and generates a huge recoil force, pushing the central shaft, the cover plate portion and the thin plate portion to rotate at a high speed along the fixing bearing.

The present invention further provides a hydrogen fuel high-speed rotating magnetohydrodynamic power generation device, comprising the hydrogen fuel high-speed rotating device as described above.

As a further improvement on the technical solution of the hydrogen fuel high-speed rotating magnetohydrodynamic power generation device of the present invention, the central shaft of the shaft portion is a negative electrode structure;

The thin plate of the thin plate portion is made of a metal conductive material, with an upper surface being a hydrophilic face, a lower surface being a hydrophobic face, and a catalytic material for hydrogen catalytic decomposition being attached to the lower surface of the thin plate;

The isolation portion of the combustion propelling portion comprises opposite annular magnets arranged at the upper and lower portions of all sector regions, the annular magnets are peripherally insulated and surrounded by a positive electrode plate, the positive electrode plate is in clearance-fit with an outer edge of all sector regions, the combustion chamber is located in an annular space surrounded by the annular magnet and the positive electrode plate, and the exhaust discharge port is located on the positive electrode plate.

As a further improvement on the technical solution of the hydrogen fuel high-speed rotating magnetohydrodynamic power generation device of the present invention, the top fan blade has thereon a concave cavity that facilitates a flow of air into the air inlet.

As a further improvement on the technical solution of the hydrogen fuel high-speed rotating magnetohydrodynamic power generation device of the present invention, a radius from a head to a tail of each sector region along a rotation direction gradually increases.

As a further improvement on the technical solution of the hydrogen fuel high-speed rotating magnetohydrodynamic power generation device of the present invention, the tail of each sector region has a sectional structure, and the tip outlet is located on the sectional structure.

As a further improvement on the technical solution of the hydrogen fuel high-speed rotating magnetohydrodynamic power generation device of the present invention, the tip outlet in each sector region along the rotation direction and the air outlet of the air inlet channel are arranged sequentially adjacent to the ignition hydrogen supply channel of the arc partition in a next sector region.

As a further improvement on the technical solution of the hydrogen fuel high-speed rotating magnetohydrodynamic power generation device of the present invention, an external support portion is further comprised, the external support portion comprising a housing provided external to the combustion propelling portion, and the housing being able to recover a water mist sprayed from the exhaust discharge port.

As a further improvement on the technical solution of the hydrogen fuel high-speed rotating magnetohydrodynamic power generation device of the present invention, the housing is fixedly connected to the fixing bearing of the shaft portion through at least one spoke.

Compared with the prior art, the hydrogen fuel high-speed rotating device of the present invention possesses the following beneficial effects:

The device craftily utilizes the structure for air intake and exhaust discharge to suck in air under centrifugal pressure and ram pressure propulsion, which is continuously pressurized during being sucked in, undergoes sudden pressure drop upon reaching the combustion chamber, and then is ejected out after being mixed and combusted with hydrogen ejected from the tip end in the combustion chamber, so as to provide thrust for the high-speed rotation. At the same time, the airflow caused by the discharge of the exhaust rotates at a high speed relative to the combustion chamber, but the speed relative to the ground is very small, such that the kinetic energy loss is greatly reduced, resulting in a ground effect, which accelerates rotation and propulsion.

Compared with the prior art, the hydrogen fuel high-speed rotating magnetohydrodynamic power generation device of the present invention possesses the following beneficial effects:

The device craftily utilizes hydrogen electrochemical reaction and direct combustion of unionized hydrogen to complete the hydrogen catalytic ionization reaction while providing jet thrust for rotation. Advantages are that it is more efficient than hydrogen fuel cells, has high power density, which is suitable for high-power and high-energy power needs, utilizes no key special components and does not require auxiliary systems such as heat dissipation, breaking limitations of proton exchange membrane on hydrogen fuel cells and low efficiency of a Carnot cycle on hydrogen internal combustion engines.

BRIEF DESCRIPTION OF THE DRAWINGS

In order to more clearly illustrate the specific embodiments of the present invention or the technical solutions in the prior art, the accompanying drawings that need to be used in the description of the specific embodiments or the prior art will be briefly introduced below. Obviously, the drawings in the following description illustrate some embodiments of the present invention. For those of ordinary skill in the art, other drawings can be obtained based on these drawings without exerting any creative effort.

Figure 1:
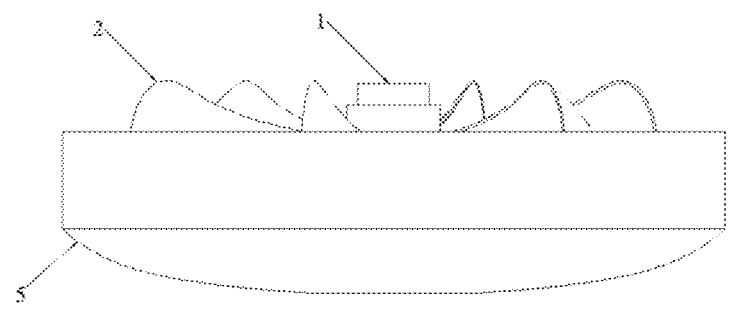
FIG. 1 is a main view of the hydrogen fuel high-speed rotating magnetohydrodynamic power generation device according to the present invention.

In the drawings: 1—shaft portion, 101—central shaft, 102—first fixing bearing, 103—second fixing bearing, 104—hydrogen supply channel port, 105—fuel channel port, 106—hydrogen supply channel, 107—water mist channel, 108—hydrogen supply port, 109—reflux discharge portion;

2—cover plate portion, 201—cover plate, 202—top fan blade, 203—air inlet, 204—concave cavity;

3—thin plate portion, 301—thin plate, 302—arc partition, 303—ignition hydrogen supply channel, 304—fuel channel, 305—external partition, 306—fuel outlet, 307—tip outlet, 308—air inlet channel;

4—combustion propelling portion, 401—annular magnet, 402—positive electrode plate, 403—exhaust discharge port; and 5—external support portion, 501—housing, 502—spoke.

DETAILED DESCRIPTION OF THE INVENTION

The technical solutions of the present invention will be clearly and completely described below with reference to the accompanying drawings. Obviously, the described examples are some, not all, of the examples of the present invention. Based on the examples of the present invention, all other examples obtained by those of ordinary skill in the art without creative efforts fall within the scope of protection of the present invention.

In the description of the present invention, it should be noted that the terms "first" and "second" are only used for descriptive purposes and cannot be understood as indicating or implying relative importance.

In the description of the present invention, it should be noted that, unless otherwise clearly stated and limited, the terms "installation", "linkage" and "connection" should be understood in a broad sense. For example, it can be a fixed connection or a detachable connection, or integral connection; it can be a mechanical connection or an electrical connection; it can be a direct linkage or an indirect linkage through an intermediate medium, or an internal communication between two components. For those of ordinary skill in the art, the specific meanings of the above terms in the present invention can be understood on a case-by-case basis.

As shown in FIGS. 1 to 12, the present invention provides a specific example of a hydrogen fuel high-speed rotating device, comprising a shaft portion 1, a cover plate portion 2, a thin plate portion 3 and a combustion propelling portion 4;

The shaft portion 1 comprises a central shaft 101 with a hollow structure, and a first fixing bearing 102 and a second fixing bearing 103 rotatably installed on the central shaft 101, wherein six hydrogen supply channel ports 104 and six fuel channel ports 105 are provided on the central shaft 101;

The cover plate portion 2 comprises a cover plate 201 fixedly installed on the central shaft 101, wherein an upper surface of the cover plate 201 has at least three top fan blades 202, all the top fan blades 202 are arranged radially with the central shaft 101 as a center, and at least one air inlet 203 is provided at a junction of a same side of each top fan blade 202 with the cover plate 201;

The thin plate portion 3 comprises at least three layers of thin plates 301 that are stacked in an axial direction and are fixedly installed on the central shaft 101, wherein adjacent thin plates 301 have therebetween a space to allow fuel to pass, an upper thin plate 301 is sealed and fixedly connected to a lower surface of the cover plate 201, all thin plates 301 are separated into independent sector regions by at least six arc partitions 302 arranged radially with the central shaft 101 as a center, all arc partitions 302 are arranged in a same twisted manner, all thin plates 301 outside each sector region are sealed and fixed with external partitions 305, an ignition hydrogen supply channel 303 is arranged interior of a side of each arc partition 302 near an outer arc along an extension direction, a fuel channel 304 is arranged interior of a side of each arc partition 302 near an inner arc along the extension direction, several fuel outlets 306 in communication with a space between the thin plates 301 in a corresponding sector region are provided on a side of an inner arc of all fuel channels 304, an inner end of the ignition hydrogen supply channel 303 is in abut communication with a corresponding hydrogen supply channel port 104, an inner end of the fuel channel 304 is in abut communication with a corresponding fuel channel port 105, a tail of each sector region along a rotation direction has a tip outlet 307 that allows fuel to pass, each sector region also has an air inlet channel 308 in communication with the air inlet 203, the air inlet channel 308 is independent from a space between thin plates 301 in the sector region, the outlet end of the air inlet channel 308 extends to an outer edge of the thin plate 301 and is close to the tip outlet 307, an outer end of the ignition hydrogen supply channel 303 extends to the outer edge of the thin plate 301 and is close to the outlet end of the air inlet channel 308, and an outer end of the fuel channel 304 has a sealed structure;

The combustion propelling portion 4 comprises an isolation portion arranged on the outer edge of all thin plates 301, wherein an inner edge of the isolation portion is in clearance-fit with an upper portion and a lower portion of all sector regions respectively, the isolation portion is capable of being enclosed into a combustion chamber, and an outer edge of the isolation portion has at least one exhaust discharge port 403.

In this example, the ignition hydrogen supply channel 303, the fuel channel 304 and the air inlet channel 308 are independent from each other and not in communication. The three channels converge in the combustion chamber, and the gases (materials) in the three channels are mixed in the combustion chamber.

Specifically, in this example, the number of the top fan blades 202 and the arc partitions 302 corresponds to the number of the sector regions. And preferably, all thin plates 301 are equally divided into six identical sector regions by six arc partitions 302.

During specific use, the number and maximum number of exhaust discharge ports 403 are adapted to the maximum air intake volume and maximum outtake volume of the combustion chamber.

In addition, there is a spacing between the outer edge of all thin plates 301 and the outer edge of the isolation portion, so that the combustion chamber can be formed. And the arrangement of the combustion propelling portion 4 will not affect the rotation of the cover plate portion 2 and the thin plate portion 3.

The invention further provides a hydrogen fuel high-speed rotating method utilizing the hydrogen fuel high-speed rotating device as described above, comprising the following steps:

(1) Ignition initiation: the hydrogen supply channel port 104 is opened, the fuel channel port 105 is closed, hydrogen is delivered to the combustion chamber after passing through the hydrogen supply channel port 104 and the ignition hydrogen supply channel 303 of the arc partition 302 in sequence, an electric spark is generated under external artificial power supply to ignite part of the hydrogen in the combustion chamber, air is transmitted to the combustion chamber sequentially through the air inlet 203 and the air inlet channel 308, and combustion of hydrogen at an hydrogen outlet of the ignition hydrogen supply channel 303 drives the central shaft 101, the cover plate portion 2 and the thin plate portion 3 to start rotating along the fixing bearing;

(2) High-speed rotation: after reaching a predetermined speed, the hydrogen supply channel port 104 is closed, the fuel channel port 105 is opened, hydrogen is delivered to the combustion chamber after passing through the fuel channel port 105, the fuel channel 304, a fuel outlet 306, space between thin plates 301 of the sector region, and the tip outlet 307 in sequence, air is sucked in by a large amount from the air inlet 203 and the air inlet channel 308 to be mixed with the hydrogen at the tip outlet 307 for lean burn in a gap formed by the combustion chamber, generating a hydrogen flame, which is ejected along the tip outlet 307 and generates a huge recoil force, pushing the central shaft 101, the cover plate portion 2 and the thin plate portion 3 to rotate at a high speed along the fixing bearing.

As shown in the figures, based on the above-mentioned hydrogen fuel high-speed rotating device, the present invention further provides a hydrogen fuel high-speed rotating magnetohydrodynamic power generation device, wherein the central shaft 101 of the shaft portion 1 is a negative electrode structure;

The thin plate 301 of the thin plate portion 3 is made of a metal conductive material, with an upper surface being a hydrophilic face, a lower surface being a hydrophobic face, and a catalytic material for hydrogen catalytic decomposition being attached to the lower surface of the thin plate 301;

The isolation portion of the combustion propelling portion 4 comprises opposite annular magnets 401 arranged at the upper and lower portions of all sector regions, the annular magnets 401 are peripherally insulated and surrounded by a positive electrode plate 402, the positive electrode plate 402 is in clearance-fit with an outer edge of all sector regions, the combustion chamber is located in an annular space surrounded by the annular magnet 401 and the positive electrode plate 402, and the exhaust discharge port 403 is located on the positive electrode plate 402. The magnetic line of force generated by the annular magnet 401 passes through the thin plate 301. The magnet is preferably a permanent magnet or an electromagnet, or can also be others.

Figure 6:
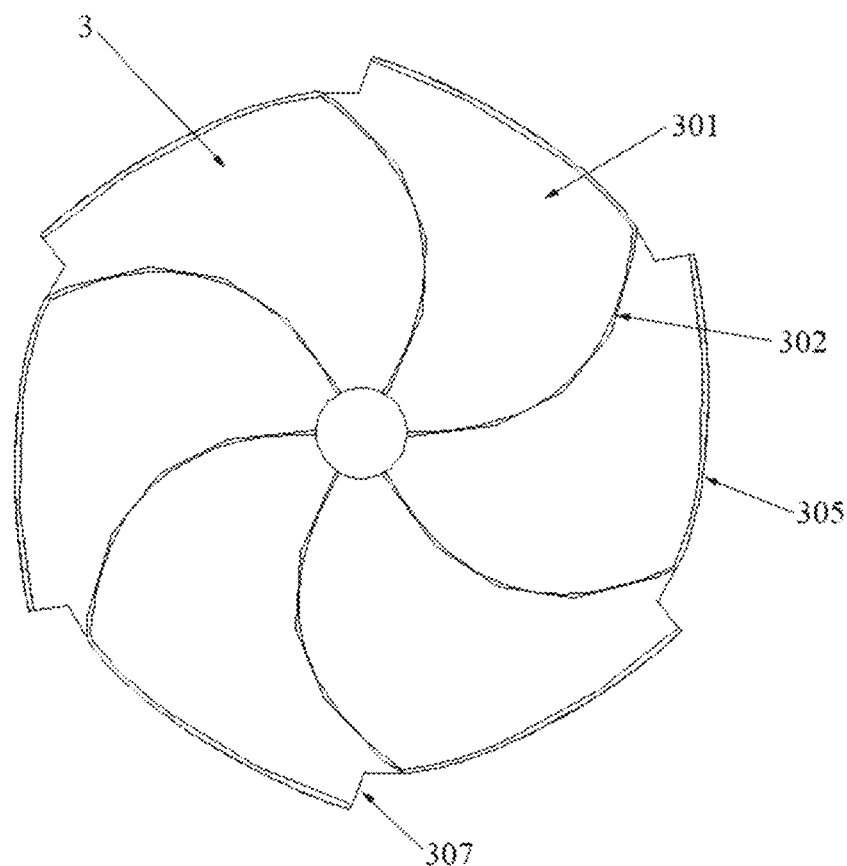
FIG. 6 is a schematic diagram of the distribution of arc partitions.
Figure 7:
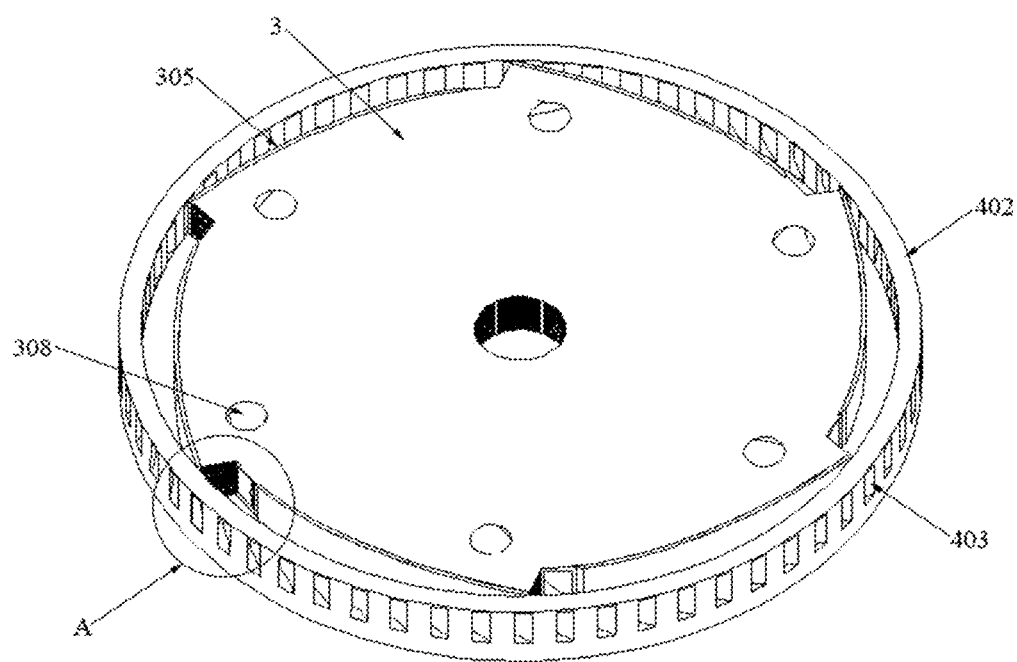
FIG. 7 is a schematic diagram of the fitting between the thin plate portion and the combustion propelling portion.

The invention also provides the specific working mechanism of the hydrogen fuel high-speed rotating magnetohydrodynamic power generation device:

(1) Ignition initiation: the hydrogen supply channel port 104 is opened, the fuel channel port 105 is closed, hydrogen is delivered to the combustion chamber after passing through the hydrogen supply channel port 104 and the ignition hydrogen supply channel 303 of the arc partition 302 in sequence, an electric spark is generated under external artificial power supply to ignite part of the hydrogen in the combustion chamber, air is delivered to the combustion chamber through the air inlet 203 and the air inlet channel 308, and hydrogen combusts to drives the central shaft 101, the thin plate portion 3 and the cover plate 2 connected thereto to rotate clockwise (taking the direction shown in FIG. 6 as an example, in which the central shaft 101 rotates and the fixing bearing stays put). At this time, the resistance of the air against the top fan blade 202 is small. When the thin plate portion 3 and the cover plate portion 2 move clockwise, the power generation device starts to rotate and preheat.

(2) High-speed rotation: After a certain rotation speed is reached, the hydrogen supply channel port 104 is closed and the fuel channel port 105 is opened. The water mist in a water mist pipe 107 flows to each irregular sector region for hydrogen ionization through the fuel channel port 105, the fuel channel 304 and the fuel outlet 306 in sequence, moistening the hydrophilic surface of each thin plate 301 in the irregular sector region, and the hydrogen in the hydrogen supply channel 106 also flows into each irregular sector region through the fuel channel port 105, the fuel channel 304 and the fuel outlet 306 at the same time, and contacts and undergoes ionization with the hydrophobic surface (the catalytic material for catalytic decomposition of hydrogen being attached hereto) of each thin plate 303 in the irregular sector region. Unionized hydrogen is delivered into the combustion chamber through the tip outlet 307. As the rotation speed of the cover plate 201 increases, air is sucked in by a large amount from the air inlet 203 and mixed with the hydrogen at the tip outlet 307 through the air inlet channel 308 for lean burn in a gap formed by the combustion chamber, generating a hydrogen flame, which is ejected along the tip outlet and generates a huge recoil force, pushing the tip outlet 307 to jet so as to rotate at a high speed (the resistance of the air against the top fan blade 202 is relatively small). At this time, since the tip outlet 307 jets and rotates at a high speed, more air can be sucked in from the air inlet 203.

(3) Power generation process: annular magnet 401 forms a top-down magnetic field in the irregular sector region. While rotating at a high speed, hydrogen comes into contact with the catalytic material for catalytic decomposition of hydrogen on the hydrophobic surface of each layer of thin plate 303, causing the hydrogen to decompose into electrons e and hydrogen protons $H^+$, which are separated under the action of the magnetic field. The electrons reach the central shaft 101 through each layer of thin plate 303 and the arc partition 302 (conductive metal) and then reaches the positive electrode plate 402 through an external load. The hydrogen protons $H^+$ reach the tip outlet 307 and enter into the combustion chamber under the actions of pressure thrust of gas and water, centrifugal force and Lorentz force, and are excited to pass the gap between the external partition 305 and the positive electrode plate 402 to move towards the positive electrode plate 402 under the actions mainly by conduction of hydrogen flames, breakdown effect, and the pressure thrust of the gas in the combustion chamber, so that the hydrogen protons $H^+$ are transported to the positive electrode plate 402, realizing a hydrogen fuel high-speed rotating magnetohydrodynamic power generation.

(4) Exhaust emission: when the mixed combustion of hydrogen and air fills the entire combustion chamber, the flame generated will produce resistance at the position of the next tip outlet 307 in the rotation direction. The setting of the exhaust discharge port 403 can reduce the resistance at the position of the next tip outlet 307, accelerating rotation of the thin plate portion 3 and improving the propelling efficiency.

In this example, after the water mist flows into each irregular sector region through the fuel channel port 105, the fuel channel 304 and the fuel outlet 306, it is more likely to be adsorbed on the hydrophilic upper surface of each thin plate 301; and after the hydrogen flows into each irregular sector region through the fuel channel port 105, the fuel channel 304 and the fuel outlet 306, it is more likely to be adsorbed on the hydrophobic lower surface of each thin plate 301. The catalytic ionization reaction of hydrogen occurs at the interface of gas, solid, and liquid phases, i.e., the interface between hydrogen, the catalytic material for catalytic decomposition of hydrogen, and water in the internal catalytic ionization area. A large three-phase intersection surface will be generated in the gap between the rough lower surface of each layer of thin plate 301 and the hydrophilic layer on the upper surface of the thin plate 301. The hydrogen is adsorbed by the catalytic material that catalytically decomposes the hydrogen when passing through the lower surface, and is ionized to produce hydrogen ions and electrons, greatly improving the catalytic ionization efficiency of hydrogen by the single-layer thin plate 301. The stacking of the thin plates 301 will allow the hydrogen gas to be more sufficiently ionized, forming a region where hydrogen is efficiently ionized, thereby enabling a more efficient power generation.

In this example, the catalytic material for catalytic decomposition of hydrogen is preferably a platinum catalyst.

In this example, the sector region makes full use of the magnetic field generated by the annular magnet 401, so that the range of the force born by the hydrogen ions generated from the ionized hydrogen under the action of the magnetic field is increased, which facilitates the hydrogen ions to reach the tip outlet 307, thereby improving the power generation efficiency.

In this example, the power generation device further comprises an external support portion 5, the external support portion 5 comprising a housing 501 provided external to the combustion propelling portion 4, and the housing 501 being able to recover a water mist sprayed from the exhaust discharge port 403.

Figure 2:
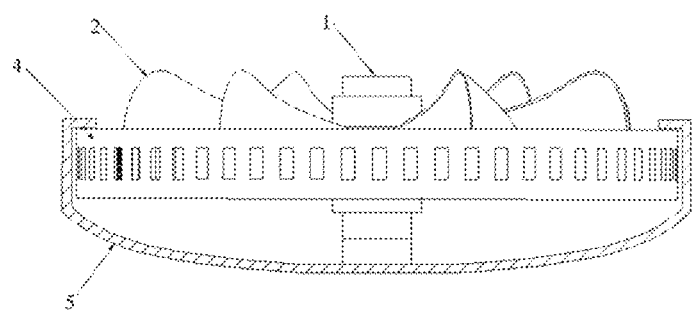
FIG. 2 is a schematic diagram of the fitting between the housing and the combustion propelling portion of the present invention.
Figure 3:
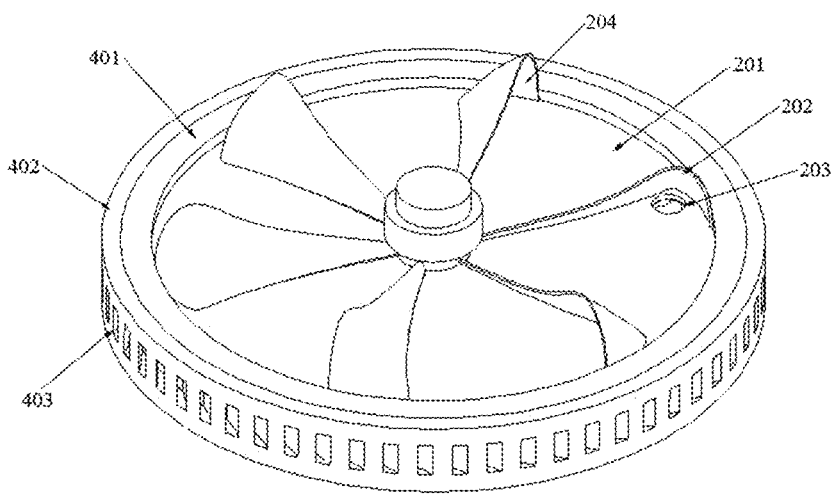
FIG. 3 is a schematic diagram of the fitting between the cover plate portion and the combustion propelling portion.
Figure 4:
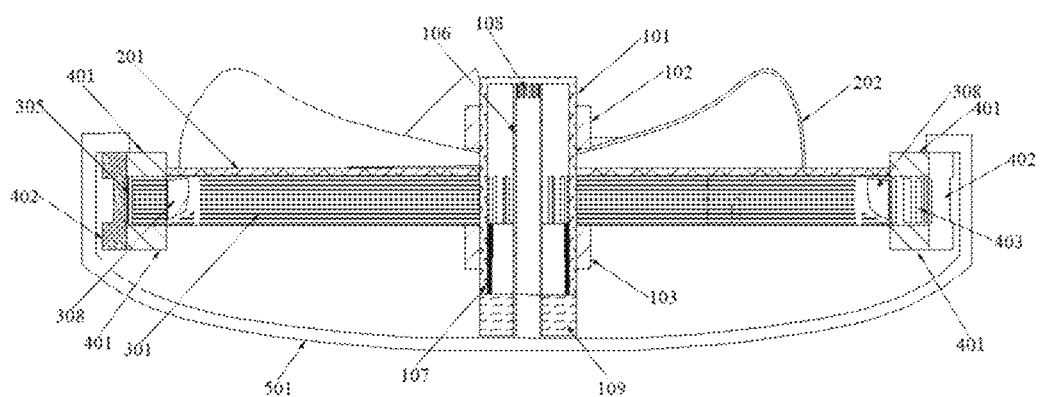
FIG. 4 is a longitudinal sectional view of the hydrogen fuel high-speed rotating magnetohydrodynamic power generation device according to the present invention.
Figure 5:
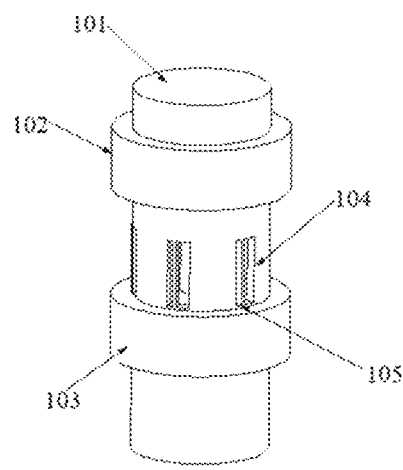
FIG. 5 is a schematic structural diagram of the shaft portion.
Figure 12:
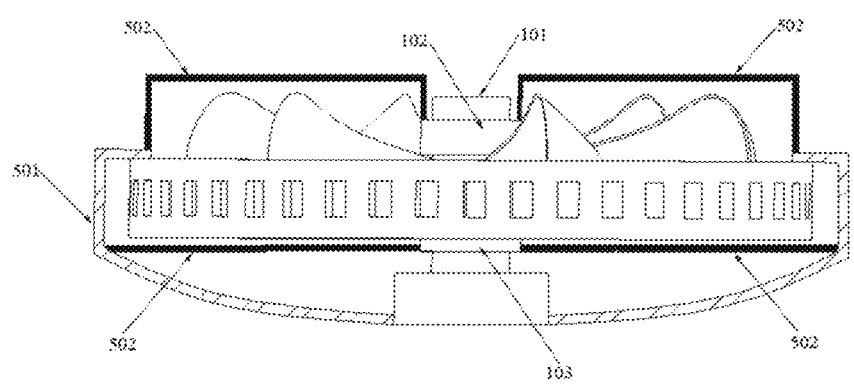
FIG. 12 is another structural schematic diagram of the external support portion.

As shown in FIGS. 2 and 12, the upper part of the housing 501 in this example is insulatedly supported on the positive electrode plate 402. There is a spacing between the middle part of the housing 501 and the positive electrode plate 402. The lower part of the housing 501 is in the shape of an arc for the discharged water mist to conveniently flow back to the bottom of the housing 501 in a concentrated manner.

In this example, a reflux discharge portion 109 is arranged at the bottom of the housing 501, the reflux discharge portion 109 is arranged with a reflux water pump, and the reflux discharge portion 109 is arranged thereon with an exhaust discharge outlet. The reflux discharge portion 109 is mainly used for water recycling and system exhaust discharge.

After the exhaust produced by combustion is discharged from the exhaust discharge port 403, the pressure decreases, but the air pressure in the housing 501 is still high compared to the external atmospheric pressure and has a certain speed. At the same time, under the action of the heat released by the cooling of the water mist generated by the exhaust, the discharged exhaust will flow toward the center of the bottom along the housing 501, forming an airflow vortex of the exhaust, and the farther it rotates toward the bottom, the smaller its rotation radius will be and the faster its speed will be. The airflow caused by the discharge of the exhaust rotates at a high speed relative to the combustion chamber, but the speed relative to the ground is very small, such that the kinetic energy loss is greatly reduced, resulting in a ground effect, which accelerates rotation and propulsion. After the exhaust generated by combustion is discharged downward from the exhaust discharge port 403, under the action of the pressure and the heat released by the cooling of the water mist generated by the exhaust, the discharged exhaust will flow toward the center of the bottom along the housing 501, forming an airflow vortex of the exhaust gas. And the farther it rotates toward the bottom, the faster its speed will be. The vortex motion drives the water pump impeller of the reflux discharge portion 109 to rotate and perform work, further recovering energy and cooling the gas. Part of the water generated by condensation is pumped into the water mist channel 107 and continuously circulates through the multi-layer space of the thin plate portion 3.

Specifically, the inner surface of the housing 501 is coated with a heat-insulating, magnetic-isolating and high-temperature-resistant hydrophobic material.

As shown in FIG. 12, in order to improve the installation stability of the housing 501, the housing 501 is fixedly connected to the first fixing bearing 103 and the second fixing bearing 104 through at least one spoke 502.

Specifically, the top fan blade 202 has thereon a concave cavity 204 to facilitate the flow of air into the air inlet 203. The concave cavity 204 can facilitate more air to enter the air inlet channel 308 through the air inlet 203.

In this example, the air inlet 203 is located at one end of the top fan blade 202 near the edge. The air inlet 203 is located on one side of the top fan blade 202. When the cover plate portion 2 is rotated, the opening position of the air inlet 203 facilitates air entry.

In this example, the thin plate portion 3 is arranged therein with multiple layers of stacked thin plates 301 to form a thousand-layer thin plate structure. The external partition 305 is located outside the sector region and can provide a relatively closed environment for the sector region.

Figure 9:
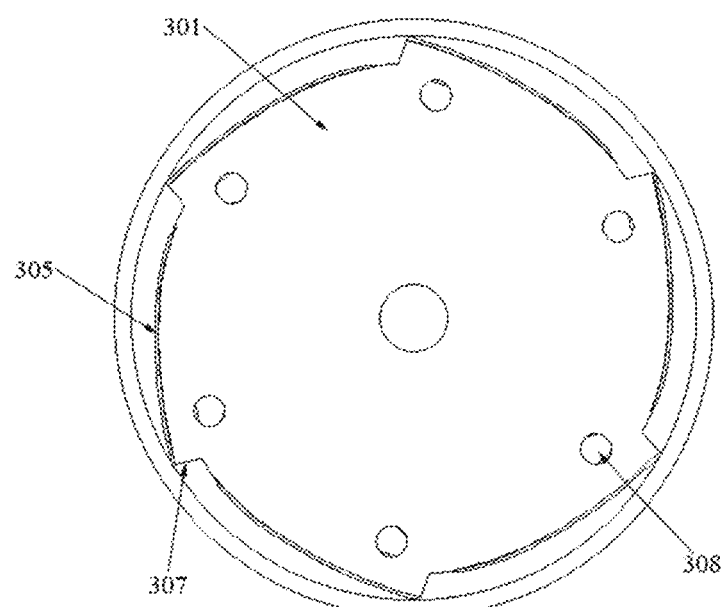
FIG. 9 is a top view of FIG. 7.
Figure 10:
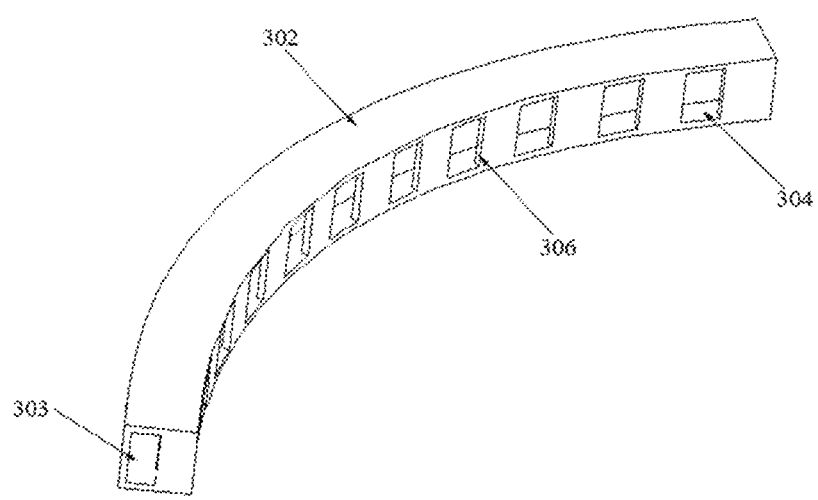
FIG. 10 is a schematic structural diagram of an arc partition.

As shown in FIG. 9, a radius from a head to a tail of each sector region along a rotation direction gradually increases, the tail of each sector region has a sectional structure, and the tip outlet 307 is located on the sectional structure. In this example, the sectional structure can be fitted with the positive electrode plate 402 so that the hydrogen flame can generate greater recoil force and promote the high-speed rotation of the thin plate portion 3.

As shown in FIG. 9, preferably, the angle between the sectional structure and the outlet end of the air inlet channel 308 is an obtuse angle.

Figure 8:
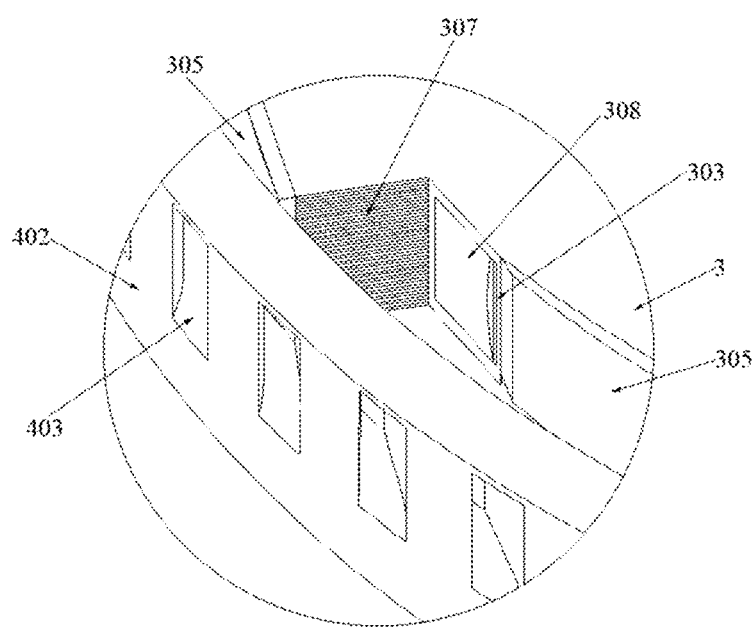
FIG. 8 is a partial enlarged view of FIG. 7.

As shown in FIG. 8, the tip outlet 307 in each sector region along the rotation direction and the air outlet of the air inlet channel 308 are arranged sequentially adjacent to the ignition hydrogen supply channel 303 of the arc partition 302 in a next sector region. The outlet end of the air inlet channel 308 is located between the tip outlet 307 and the ignition hydrogen supply channel 303, which can facilitate the provision of oxygen for hydrogen combustion.

Specifically, the annular magnets 401 in the upper and lower portions of the sector region are of the same size and shape, and have opposite magnetic poles. Preferably, the axis of the annular magnet 401 and the axis of the central shaft 101 are located in the same line. In addition, in this example, the height of the positive electrode plate 402 is adapted to the height of the two annular magnets 401. Preferably, the channel extension direction of the exhaust discharge port 403 matches the direction of the gas ejected from the tip outlet 307.

Figure 11:
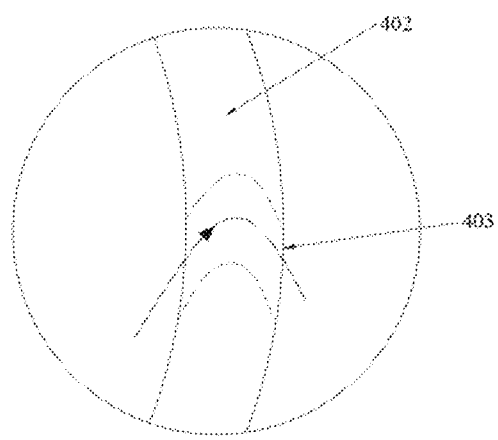
FIG. 11 is a schematic diagram of the layout of the exhaust discharge port.

As shown in FIG. 11, the air inlet on the inner surface and the air outlet on the outer surface of the exhaust discharge port 403 are in the same radial direction (the projection of the air inlet and the air outlet toward the center is the same), but the channel of the exhaust discharge port 403 curves backward the travelling direction (a channel from the inside to the outside curves first backward and then forward). The exhaust discharge port 403 shows, from inside to outside, the direction of first entering the air inlet on the inner surface of the exhaust discharge port 403 along the tangential direction of the tip outlet 307, and then turns to the air outlet on the outer surface after passing through the curved section. This facilitates discharge of gas through the exhaust discharge port 403 at the same time of providing a certain recoil force for the operation of the tip outlet 307.

In this example, the ignition hydrogen supply channel 303 of the arc partition 302 is of an elongated pipe structure, which facilitates the discharge and burning of the waste gas existing in the device in time to avoid backfire and explosion and assure safety.

Specifically, the sectional dimension of the air inlet channel 308 of the guide channel from the air inlet 203 to the tip outlet 307 gradually decreases. The air pressure gradually increases along with the changes in the sectional dimension of the pipe. The sudden decrease in air pressure at the outlet end of the air inlet channel 308 generates a huge impulsion, which further promotes the high-speed rotation of the thin plate portion 3.

In specific applications, the central shaft 101 of this example is arranged therein with a hydrogen supply channel 106 and a water mist channel 107, the hydrogen supply channel 106 extending to a top of the central shaft 101, and a hydrogen supply port 108 being provided at a top of the hydrogen supply channel 106. The hydrogen in the hydrogen supply channel 106 enters the inner cavity of the central shaft 101 through the hydrogen supply port 108, and then enters the gas supply channel port 104 and the fuel channel port 105, respectively, according to actual application conditions. The water mist can enter the fuel channel port 105 through the water mist channel 107.

In this example, the water mist channel 107 can be connected to the reflux water pump of the reflux exhaust portion 109 or an external water supply facility. According to specific requirements, the water mist channel 107 can also be arranged with structures such as a sprinkler.

Finally, it should be noted that the above examples are only used to illustrate the technical solutions of the present invention, but not to make limitations. Although the present invention has been described in detail with reference to the foregoing examples, those of ordinary skill in the art should understand that: the technical solutions described in the foregoing examples can still be modified, or some or all of the technical features can be equivalently replaced; and these modifications or replacements do not deviate the essence of the corresponding technical solutions from the range of technical solutions of the examples of the present invention.

What is claimed is:

1. A hydrogen fuel high-speed rotating device, comprising a shaft portion (1), a cover plate portion (2), a thin plate portion (3) and a combustion propelling portion (4);

the shaft portion (1) comprising a central shaft (101) with a hollow structure, and at least one fixing bearing rotatably installed on the central shaft (101), wherein at least three hydrogen supply channel ports (104) and at least three fuel channel ports (105) are provided on the central shaft (101);

the cover plate portion (2) comprising a cover plate (201) fixedly installed on the central shaft (101), wherein an upper surface of the cover plate (201) has at least three top fan blades (202), all the top fan blades (202) are arranged radially with the central shaft (101) as a center, and at least one air inlet (203) is provided at a junction of a same side of each top fan blade (202) with the cover plate (201);

the thin plate portion (3) comprising at least three layers of thin plates (301) that are stacked in an axial direction and are fixedly installed on the central shaft (101), wherein adjacent thin plates of the thin plates (301) have therebetween a space to allow fuel to pass, an upper thin plate of the thin plates (301) is sealed and fixedly connected to a lower surface of the cover plate (201), all of the thin plates of the at least three layers of thin plates (301) are separated into independent sector regions by at least three arc partitions (302) arranged radially with the central shaft (101) as a center, all arc partitions (302) are arranged in a same twisted manner, all of the thin plates (301) outside each sector region are sealed and fixed with external partitions (305), an ignition hydrogen supply channel (303) is arranged interior of a side of each arc partition (302) near an outer arc along an extension direction, a fuel channel (304) is arranged interior of a side of each arc partition (302) near an inner arc along the extension direction, several fuel outlets (306) in communication with the space between the adjacent thin plates (301) in a corresponding sector region are provided on a side of an inner arc of all fuel channels (304), an inner end of the ignition hydrogen supply channel (303) is in abut communication with a corresponding hydrogen supply channel port (104), an inner end of the fuel channel (304) is in abut communication with a corresponding fuel channel port (105), a tail of each sector region along a rotation direction has a tip outlet (307) that allows fuel to pass, each sector region also has an air inlet channel (308) in communication with one of the at least one air inlets (203), each air inlet channel (308) is independent from the space between adjacent thin plates (301) in the corresponding sector region, an outlet end of each of the air inlet channels (308) extends to a respective outer edge of the thin plates (301) and is close to a corresponding one of the tip outlets (307), an outer end of each of the ignition hydrogen supply channels (303) extends to the respective outer edge of the thin plates (301) and is close to the outlet end of a corresponding one of the air inlet channels (308), and an outer end of each fuel channel (304) has a sealed structure; and the combustion propelling portion (4) comprising an isolation portion arranged on the outer edge of all of the thin plates of the at least three layers of thin plates (301), wherein an inner edge of the isolation portion is in clearance-fit with an upper portion and a lower portion of all sector regions respectively, the isolation portion is capable of being enclosed into a combustion chamber, and an outer edge of the isolation portion has at least one exhaust discharge port (403).

2. A hydrogen fuel high-speed rotating method utilizing the hydrogen fuel high-speed rotating device as claimed in claim 1, comprising the following steps:

(1) ignition initiation: all of the hydrogen supply channel ports (104) are opened, all of the fuel channel ports (105) are closed, hydrogen is delivered to the combustion chamber after passing through the corresponding one of hydrogen supply channel ports (104) and the corresponding one of ignition hydrogen supply channels (303) of all of the arc partitions (302) in sequence, an electric spark is generated under external artificial power supply to ignite part of the hydrogen in the combustion chamber, air is transmitted to the combustion chamber sequentially through one of the at least one air inlet (203) and the corresponding one of the air inlet channels (308), and combustion of hydrogen at an hydrogen outlet of the ignition hydrogen supply channel (303) drives the central shaft (101), the cover plate portion (2) and the thin plate portion (3) to start rotating along the fixing bearing;

(2) high-speed rotation: after reaching a predetermined speed, all of the hydrogen supply channel ports (104) are closed, all of the fuel channel ports (105) are opened, hydrogen is delivered to the combustion chamber after passing through the corresponding one of fuel channel ports (105), the corresponding one of fuel channels (304), the several fuel outlets (306), the space between adjacent thin plates (301) of the corresponding sector region, and the corresponding one of tip outlets (307) in sequence, air is sucked in by a large amount from one of the at least one air inlet (203) and the corresponding one of the air inlet channels (308) to be mixed with the hydrogen at the corresponding one of tip outlets (307) for lean burn in a gap formed by the combustion chamber, generating a hydrogen flame, which is ejected along the tip outlet (307) and generates a recoil force, pushing the central shaft (101), the cover plate portion (2) and the thin plate portion (3) to rotate at a speed along the fixing bearing.

3. A hydrogen fuel high-speed rotating magnetohydrodynamic power generation device, comprising the hydrogen fuel high-speed rotating device according to claim 1.

4. The hydrogen fuel high-speed rotating magnetohydrodynamic power generation device according to claim 3, wherein, the central shaft (101) of the shaft portion (1) is a negative electrode structure;

each thin plate (301) of the thin plate portion (3) is made of a metal conductive material, with an upper surface being a hydrophilic face, a lower surface being a hydrophobic face, and a catalytic material for hydrogen catalytic decomposition being attached to the lower surface of the thin plate (301); and the isolation portion of the combustion propelling portion (4) comprises opposite annular magnets (401) arranged at the upper and lower portions of all sector regions, the annular magnets (401) are peripherally insulated and surrounded by a positive electrode plate (402), the positive electrode plate (402) is in clearance-fit with an outer edge of all sector regions, the combustion chamber is located in an annular space surrounded by the annular magnet (401) and the positive electrode plate (402), and the exhaust discharge port (403) is located on the positive electrode plate (402).

5. The hydrogen fuel high-speed rotating magnetohydrodynamic power generation device according to claim 4, wherein each of the top fan blades (202) has thereon a concave cavity (204) that facilitates a flow of air into a respective one of the at least one air inlet (203).

6. The hydrogen fuel high-speed rotating magnetohydrodynamic power generation device according to claim 4, wherein a radius from a head to a tail of each sector region along a rotation direction gradually increases.

7. The hydrogen fuel high-speed rotating magnetohydrodynamic power generation device according to claim 6, wherein the tail of each sector region has a sectional structure, and the tip outlet (307) is located on the sectional structure.

8. The hydrogen fuel high-speed rotating magnetohydrodynamic power generation device according to claim 6, wherein the tip outlet (307) in each sector region along the rotation direction and the air outlet of one of the air inlet channels (308) are arranged sequentially adjacent to the ignition hydrogen supply channel (303) of the arc partition (302) in a next sector region.

9. The hydrogen fuel high-speed rotating magnetohydrodynamic power generation device according to claim 4, further comprising an external support portion (5), the external support portion (5) comprising a housing (501) provided external to the combustion propelling portion (4), and the housing (501) being able to recover a water mist sprayed from the exhaust discharge port (403).

10. The hydrogen fuel high-speed rotating magnetohydrodynamic power generation device according to claim 9, wherein the housing (501) is fixedly connected to the fixing bearing of the shaft portion (1) through at least one spoke (502).

11. The hydrogen fuel high-speed rotating magnetohydrodynamic power generation device according to claim 4, wherein the annular magnet (401) is a permanent magnet or an electromagnet.

\* \* \* \* \*